United States Patent
Honda et al.

(10) Patent No.: US 8,337,797 B2
(45) Date of Patent: Dec. 25, 2012

(54) METHOD FOR PRODUCING BIS(FLUOROSULFONYL)IMIDE

(75) Inventors: Tsunetoshi Honda, Akita (JP); Takeshi Kamiya, Akita (JP)

(73) Assignees: Mitsubishi Materials Corporation, Tokyo (JP); Mitsubishi Materials Electronic Chemicals Co., Ltd., Akita-shi (JP)

( * ) Notice: Subject to any disclaimer, the term of this patent is extended or adjusted under 35 U.S.C. 154(b) by 0 days.

(21) Appl. No.: 13/258,017

(22) PCT Filed: Mar. 31, 2010

(86) PCT No.: PCT/JP2010/002394
§ 371 (c)(1),
(2), (4) Date: Sep. 21, 2011

(87) PCT Pub. No.: WO2010/113514
PCT Pub. Date: Oct. 7, 2010

(65) Prior Publication Data
US 2012/0009113 A1 Jan. 12, 2012

(30) Foreign Application Priority Data
Mar. 31, 2009 (JP) ................................ 2009-084159

(51) Int. Cl.
*C01B 21/084* (2006.01)
(52) U.S. Cl. ..................................................... 423/386
(58) Field of Classification Search .......... 423/385–388, 423/467, 659
See application file for complete search history.

(56) References Cited

U.S. PATENT DOCUMENTS
3,379,509 A * 4/1968 Appel ........................... 423/388
2004/0097757 A1 5/2004 Cernik et al.

FOREIGN PATENT DOCUMENTS

| JP | 8-511274 A | 11/1996 |
|---|---|---|
| JP | 2004-522681 A | 7/2004 |
| JP | 2007-182410 A | 7/2007 |
| JP | 2009-504790 A | 2/2009 |

OTHER PUBLICATIONS

Menzinger et al, "Dynamical Consequences of Nonideal Mixing in Continuously Stirred Tank Reactor Studies of Chemical Instabilities: Comparative Stirring Effects of Premixed and Nonpremixed Feed on the Bistable ClO2- + I-Reaction," 1986, J. Phys. Chem. vol. 90, pp. 313-315.*
Rolf Appel et al., "Synthesis of Imidodisulfuric acid fluoride, $HN(SO_2F)_2$," Institute of Inorganic Chemistry, University of Heidelberg, 95, 1961, pp. 246-248 and English translation thereof (published 1962).
John K. Ruff et al., "Imidodisulfuryl Fluoride, Cesium Imidodisulfuryl Fluoride, And Fluoroimidodisulfuryl Fluoride", Inorganic Syntheses, pp. 138-143 (1968).
Martin Beran et al., "A New Method of the Preparation of Imido-bis(sulfuric acid) Dihalogenide, (F,Cl), and the Potassium Salt of Imido-bis(Sulfuric acid) Difluoride," Z. Anorg. Allg. Chem. 2005, 631, pp. 55-59 and a cover page.
International Search Report dated Jun. 29, 2010, issued for PCT/JP2010/002394.

* cited by examiner

*Primary Examiner* — Wayne Lengel
*Assistant Examiner* — Justin Bova
(74) *Attorney, Agent, or Firm* — Edwards Wildman Palmer LLP

(57) ABSTRACT

According to the method for producing bis(fluorosulfonyl)imide of the present invention, first, an unreacted mixed liquid is prepared by mixing a first fluorosulfonic acid with urea in a condition free of a chemical reaction between the first fluorosulfonic acid and urea. Then, the unreacted mixed liquid is dripped into a heated second fluorosulfonic acid or a heated bis(fluorosulfonyl)imide, allowing a chemical reaction between fluorosulfonic acid and urea to proceed. In this method, generation of carbon dioxide gas and heat during the chemical reaction can be controlled.

8 Claims, No Drawings

METHOD FOR PRODUCING BIS(FLUOROSULFONYL)IMIDE

TECHNICAL FIELD

The present invention relates to a method for producing bis(fluorosulfonyl)imide.

Priority is claimed on Japanese Patent Application No. 2009-084159 filed Mar. 31, 2009, and the content of which is incorporated herein by reference.

BACKGROUND ART

It has been known that bis(fluorosulfonyl)imide (($FSO_2$)$_2$NH) is an useful anion source for ion electrical conducting materials and ion liquids. As methods for producing bis(fluorosulfonyl)imide, there are methods disclosed in the Patent Literature (PTL) 1, the PTL2, Non-Patent Literature (NPL) 1, and NPL2.

In the NPL1, a method, in which urea ($CO(NH_2)_2$) and fluorosulfonic acid ($FSO_3H$) are mixed first, and then the resulting mixture is heated to proceed the chemical reaction between them, is disclosed. In this reaction, the chemical reaction represented by the formula (1) below proceeds, producing bis(fluorosulfonyl)imide, ammonium hydrogen sulfate ($NH_4HSO_4$), hydrogen fluoride (HF), and carbon dioxide ($CO_2$). The produced bis(fluorosulfonyl)imide and the fluorosulfonic acid that is input excessively can be recovered by distillation under reduced pressure.

$$3FSO_3H + CO(NH_2)_2 \rightarrow (FSO_2)_2NH + NH_4HSO_4 + HF + CO_2 \quad (1)$$

In the NPL2, a method, in which bis(chlorosulfonyl)imide (($ClSO_2$)$_2$NH) and arsenic trifluoride ($AsF_3$) are reacted, is disclosed. In this reaction, the chemical reaction represented by the formula (2) below proceeds, producing bis(fluorosulfonyl)imide and arsenic trichloride ($AsCl_3$).

$$3(ClSO_2)_2NH + 2AsF_3 \rightarrow 3(FSO_2)_2NH + 2AsCl_3 \quad (2)$$

In the PTL1 and PTL2, methods, in which bis(chlorosulfonyl)imide and potassium fluoride (KF) are reacted, are disclosed. In this reaction, the chemical reaction represented by the formula (3) below proceeds, producing bis(fluorosulfonyl)imide and potassium chloride (KCl). In the method described in the PTL1, the bis(chlorosulfonyl)imide is subjected to fluorine displacement by potassium fluoride in a nitromethane solvent. In the method described in the PTL2, the bis(chlorosulfonyl)imide is subjected to fluorine displacement in the presence of a basic catalyst in an organic solvent by potassium fluoride.

$$(ClSO_2)_2NH + 2KF \rightarrow (FSO_2)_2NH + 2KCl \quad (3)$$

Related Art Document
Patent Literature
    [PTL1] Published Japanese Translation No. 2004-522681
    [PTL2] Japanese Unexamined Patent Application, First Publication No. 2007-182410
Non-Patent Literature
    [NPL1] Chem. Bet 95, 246-8 (1962) (Appel&Eisenhauser)
    [NPL2] Inorg. Synth. 11, 138-43 (1968)

DISCLOSURE OF INVENTION

Technical Problem

In producing bis(fluorosulfonyl)imide, the method using urea and fluorosulfonic acid is industrially advantageous, since it takes short period of time for a reaction process and the precursors for the reaction are inexpensive. However, in the method for producing bis(fluorosulfonyl)imide disclosed in the NPL1, there is no carbon dioxide gas generation in the early phase of the reaction (referred as "the accumulation of the reaction" hereinafter). Then, generation of the carbon dioxide gas is abruptly increased and the reaction temperature is increased dramatically in the middle phase of the reaction, resulting a chemical reaction proceeding with an uncontrollably fast rate. For that reason, the method described in the NPL1 has not been industrially feasible.

In the methods for producing bis(fluorosulfonyl)imide disclosed in the NPL2, PTL1, and PTL2, it has been problematic to obtain bis(chlorosulfonyl)imide, which is a precursor in the methods, in an industrial scale. Also, in the method for producing bis(fluorosulfonyl)imide disclosed in the NPL2, the arsenic trifluoride, which is a precursor in the method, is expensive and highly toxic, making it difficult to handle.

The present invention was made under circumstances described above. The purpose of the present invention is to provide a method for producing bis(fluorosulfonyl)imide enabling to control generation of carbon dioxide and reaction heat.

Solution to Problem

An aspect of the present invention is a method for producing bis(fluorosulfonyl)imide including steps of: preparing an unreacted mixed liquid by mixing a first fluorosulfonic acid with urea in a condition free of a chemical reaction between the first fluorosulfonic acid and urea; and dripping the unreacted mixed liquid into a heated second fluorosulfonic acid or a heated bis(fluorosulfonyl)imide, allowing a chemical reaction between fluorosulfonic acid and urea to proceed. In the method for producing bis(fluorosulfonyl)imide, the temperature of the heated second fluorosulfonic acid or the heated bis(fluorosulfonyl)imide in the step of dripping may range from 100° C. to 170° C. Also, in the method for producing bis(fluorosulfonyl)imide, at least one of bis(fluorosulfonyl)imide and bis(fluorosulfonyl)imide salt represented by a chemical formula (A) below may be added to the second fluorosulfonic acid, M in the chemical formula (A) being a cation selected from the group consisting of Na, K, Li, and ammonium.

$$(FSO_2)_2N.M \quad (A)$$

Also, in the method for producing bis(fluorosulfonyl)imide, an end reaction liquid that contains bis(fluorosulfonyl)imide may added to the second fluorosulfonic acid.

Advantageous Effects of Invention

The method for producing bis(fluorosulfonyl)imide of the present invention includes a step of preparing an unreacted mixed liquid by mixing a fluorosulfonic acid with urea in a condition free of a chemical reaction between the fluorosulfonic acid and the urea at the room temperature in advance and a step of dripping the unreacted mixed liquid into a separately prepared heated fluorosulfonic acid or bis(fluorosulfonyl)imide. Having the configuration explained above, bis(fluorosulfonyl)imide can be produced while controlling the generation of carbon dioxide gas and reaction heat.

In addition, by adding bis(fluorosulfonyl)imide or bis(fluorosulfonyl)imide salt to the heated fluorosulfonic acid, occurrence of the accumulation of the reaction can be prevented.

Therefore, bis(fluorosulfonyl)imide, which is an useful anion source for ion electrical conducting materials and ion liquids, can be produced safely and easily.

BEST MODE FOR CARRYING OUT THE INVENTION

The method for producing bis(fluorosulfonyl)imide of the present invention is explained in detail below.

The method for producing bis(fluorosulfonyl)imide of the present invention includes a step of preparing an unreacted mixed liquid by mixing a first fluorosulfonic acid with urea in a condition free of a chemical reaction between the first fluorosulfonic acid and the urea and a step of dripping the unreacted mixed liquid into a heated second fluorosulfonic acid or a heated bis(fluorosulfonyl)imide, allowing a chemical reaction between the fluorosulfonic acid and the urea to proceed (step of dripping and reacting). Followings are detailed descriptions about each step.

[Step of Preparing]

In the step of preparing, fluorosulfonic acid and urea are mixed in a condition where the fluorosulfonic acid and urea do not react each other, and an unreacted mixed liquid that contains urea and fluorosulfonic acid (hereinafter referred as an unreacted mixed liquid) is prepared. The preparation of the unreacted mixed liquid can be performed easily, for example by adding a small amount of urea multiple times with an interval to fluorosulfonic acid that is cooled to 0 to 30° C. If the temperature of the fluorosulfonic acid was higher than 100° C., the chemical reaction between the added urea and the fluorosulfonic acid would proceed. In this step of preparing of the present invention, it is important to mix the urea and the fluorosulfonic acid without progression of the chemical reaction between them, having the urea dissolved in the fluorosulfonic acid. Thus, it is necessary to keep the temperature of the fluorosulfonic acid below 100° C.

The preferred amount of the fluorosulfonic acid dissolving the urea (the first fluorosulfonic acid) by mass is 2 to 20 times the mass of the added urea (total). An even more preferred amount of the fluorosulfonic acid is 3 to 10 times the mass of the added urea. It is not preferable that the amount of the fluorosulfonic acid is less than 2 times the mass of the added urea (total), since the urea is not dissolved in the fluorosulfonic acid completely and precipitated. On the other hand, having the amount of the fluorosulfonic acid more than 10 times the mass of the added urea is economically wasteful.

The unreacted mixed liquid prepared as explained above is chemically stable at the room temperature and handled very easily.

[Step of Dripping and Reacting]

Then, the unreacted mixed liquid is dripped into a heated fluorosulfonic acid or bis(fluorosulfonyl)imide, and the chemical reaction between the urea and the fluorosulfonic acid is allowed to proceed. In this method of the present invention, the urea is dissolved in the fluorosulfonic acid in advance in the step of preparing described above. Once the urea dissolved in the fluorosulfonic acid is dripped into and contacts with the heated fluorosulfonic acid or bis(fluorosulfonyl)imide, the chemical reaction between the urea and the fluorosulfonic acid is allowed to proceed immediately. By allowing the reaction to proceed incrementally with dripping the urea dissolved in the fluorosulfonic acid, generation of carbon dioxide and reaction heat can be controlled. As a result, a chemical reaction proceeding with an uncontrollably fast rate can be prevented without an abrupt generation of carbon dioxide and an intense heat.

It has been regarded that the mechanism of the chemical reaction in the method of the present invention is basically similar to the mechanism represented by the above chemical reaction formula (1) described in the NPL1. However, the mechanism of the chemical reaction of the method of the present invention is believed to be different from that represented by the chemical reaction formula (1) shown above, since it has been confirmed that the amounts of ammonium hydrogen sulfate and hydrogen fluoride produced are extremely smaller than expected based on the chemical formula (1). Taking the fact into consideration, it is predicted that bis(fluorosulfonyl)imide, ammonium fluorosulfonate, and carbon dioxide are produced by the chemical reaction formula (4) shown below in the method of the present invention.

$$5FSO_3H + 2CO(NH_2)_2 \rightarrow (FSO_2)_2NH + 3NH_4SO_3F + CO_2 \quad (4)$$

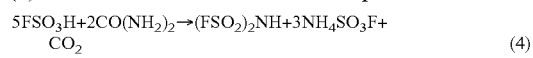

The preferred amount of the fluorosulfonic acid that is heated in advance (the second fluorosulfonic acid) by mass is 1 to 20 times the amount of the urea dissolved in the unreacted mixed liquid. An even more preferable amount of the second fluorosulfonic acid by mass is 1 to 10 times the amount of the urea dissolved in the unreacted mixed liquid. Using the second fluorosulfonic acid more than 10 times is economically wasteful.

The preferred reaction temperature of the second fluorosulfonic acid ranges from 100 to 170° C. during the dripping of the unreacted mixed liquid. An even more preferred reaction temperature of the second fluorosulfonic acid ranges from 110 to 150° C. Having the reaction temperature lower than 100° C. is not preferable since it increases the occurrence of the accumulation of the reaction. Therefore, for example, it is preferable to control the temperature of the second fluorosulfonic acid that is heated in advance between 120 to 140° C.

The term, accumulation of the reaction, in this specification means a phenomenon in which carbon dioxide gas is not formed in the early phase of the reaction as observed in the method for producing bis(fluorosulfonyl)imide disclosed in the NPL1. When the accumulation of the reaction occurs, it is followed by a chemical reaction with an uncontrollably fast rate proceeding with an abrupt generation of carbon dioxide gas and an intense heat.

In the method for producing bis(fluorosulfonyl)imide of the present invention, it is preferable to add an additive agent in advance to the heated second fluorosulfonic acid. As explained above, in the method of the present invention, it is mostly possible to control the generation of carbon dioxide gas and heat by allowing to proceed the chemical reaction with dripping. By adding the additive agent to the heated second fluorosulfonic acid in advance, the accumulation of the reaction that is prone to occurs at the beginning of the dripping can be prevented.

As an additive agent, bis(fluorosulfonyl)imide, which is a product of the production method of the present invention, or bis(fluorosulfonyl)imide salt represented by the chemical formula (A) can be used. Alternatively, a mixture containing at least one of the bis(fluorosulfonyl)imide and the bis(fluorosulfonyl)imide salt can be used as the additive agent.

$$(FSO_2)_2N.M \quad (A)$$

In the above chemical formula (A), the symbol M represents a cation selected from the group consisted of Na, K, Li, and ammonium. Examples of bis(fluorosulfonyl)imide salt represented by the chemical formula (A) includes bis(fluorosulfonyl)imide sodium salt $((FSO_2)_2N.Na)$, bis(fluorosulfonyl)imide potassium salt $((FSO_2)_2N.K)$, bis(fluorosulfonyl)imide lithium salt $((FSO_2)_2N.Li)$, and bis(fluorosulfonyl)imide ammonium salt $((FSO_2)_2N.NH_4)$.

The preferable amount of the additive agent in mass is 0.01 to 1.0 time the mass of the second fluorosulfonic acid. An even more preferable amount of the additive agent is 0.02 to 0.1 time the mass of the second fluorosulfonic acid. Having the amount of the additive agent less than 0.01 times is not preferable since the accumulation of the reaction cannot be prevented. On the other hand, having the amount of the additive agent more than 1.0 time will not improve the effect and economically wasteful.

Since bis(fluorosulfonyl)imide is a product of the production method of the present invention, a reaction liquid obtained after completion of the chemical reaction in the method of the present invention can be added to the second fluorosulfonic acid in advance before another round of the reaction.

In case where the reaction liquid after completion of the reaction is used as an additive agent, the preferable amount of the reaction liquid by mass is 0.05 to 1.0 times the mass of the second fluorosulfonic acid, although it depends on the concentration of bis(fluorosulfonyl)imide in the reaction liquid. An even more preferable amount of the reaction liquid is 0.1 to 0.5 times the mass of the second fluorosulfonic acid. Having the amount of the reaction liquid as an additive agent less than 0.05 times is not preferable since the accumulation of the reaction cannot be prevented. On the other hand, having the amount of the reaction liquid as an additive agent more than 1.0 time will not improve the effect and economically wasteful.

In case where bis(fluorosulfonyl)imide is heated and used as an alternative of the second fluorosulfonic acid, it is as effective as the case where the additive agent is added to the second fluorosulfonic acid. Thus, there is no need to add an additive agent in this case.

As explained above, the method for producing bis(fluorosulfonyl)imide of the present invention includes the step of preparing the unreacted mixed liquid by mixing fluorosulfonic acid with urea in a condition free of a chemical reaction between the fluorosulfonic acid and the urea at the room temperature in advance and the step of dripping the unreacted mixed liquid into the separately prepared heated fluorosulfonic acid or bis(fluorosulfonyl)imide. Having the configuration explained above, bis(fluorosulfonyl)imide can be produced while controlling the generation of carbon dioxide gas and reaction heat.

By adding bis(fluorosulfonyl)imide or bis(fluorosulfonyl)imide salt as an additive agent to the heated fluorosulfonic acid, the accumulation of the reaction occurring at the early phase of the dripping can be prevented. As a result, the bis(fluorosulfonyl)imide, which is known as an useful anion source for ion electrical conducting materials and ion liquids, can be produced safely and easily.

EXAMPLES

The advantageous effect of the present invention is explained in detail with Examples below. The present invention is not limited by configuration detailed in Examples.

Example 1

First, 1.6 kg of fluorosulfonic acid was placed in a reaction container whose internal volume was 3 L. The reaction container was made of polytetrafluoroethylene (PTFE) and equipped with a mixer and a thermometer. Then, 400 g of urea was added to the fluorosulfonic acid in the reaction container little by little with cooling to prepare a fluorosulfonic acid solution containing urea.

Alongside, 1.2 kg of fluorosulfonic acid was placed in a reaction container whose internal volume was 5 L. The reaction container was made of stainless, and the surface of the reaction container was coated by polytetrafluoroethylene (PTFE). The container was equipped with a mixer, a thermometer, and a gas flowmeter. The fluorosulfonic acid in this reaction container made of stainless steel was heated to hold its temperature at 130° C. To the heated fluorosulfonic acid, the fluorosulfonic acid solution dissolving the urea was dripped at a rate of 270 g/Hr with a metering pump. Generation of carbon dioxide gas was confirmed when about 100 g of the fluorosulfonic acid solution dissolving the urea was dripped. After that, carbon dioxide gas was generated at a constant rate. At the end of the dripping, 153 L of gas was generated as a total. The reaction temperature during the dripping was kept between 120 to 135° C. The reaction liquid was cooled to the room temperature, dissolved in water, and analyzed with $^{19}$F-NMR. In the analysis, the peak showing the presence of bis(fluorosulfonyl)imide at 52.1 ppm was detected. The recovery using the precursor urea as an internal standard was 41%.

Example 2

First, 3.2 kg of fluorosulfonic acid was placed in a reaction container whose internal volume was 5 L. The reaction container was made of PTFE and equipped with a mixer and a thermometer. Then, 800 g of urea was added to the fluorosulfonic acid in the reaction container little by little with cooling to prepare a fluorosulfonic acid solution containing urea.

Alongside, 2.4 kg of fluorosulfonic acid and 80 g of bis(fluorosulfonyl)imide were placed in a reaction container whose internal volume was 5 L. The reaction container was made of stainless, and the surface of the reaction container was coated by PTFE. The container was equipped with a mixer, a thermometer, and a gas flowmeter. The fluorosulfonic acid and the bis(fluorosulfonyl)imide in this reaction container made of stainless steel were heated to hold its temperature at 120° C. To the heated fluorosulfonic acid and the bis(fluorosulfonyl)imide, the fluorosulfonic acid solution dissolving the urea was dripped at a rate of 525 g/Hr with a metering pump. Generation of carbon dioxide was confirmed once the dripping started. Then, carbon dioxide gas was generated at a constant rate. At the end of the dripping, 299 L of gas was generated as a total. The reaction temperature during the dripping was kept between 120 to 125° C. The reaction liquid was cooled to the room temperature, dissolved in water, and analyzed with $^{19}$F-NMR. In the analysis, the peak showing the presence of bis(fluorosulfonyl)imide at 52.1 ppm was detected. The recovery using the precursor urea as an internal standard was 43%.

Example 3

First, 3.2 kg of fluorosulfonic acid was placed in a reaction container whose internal volume was 5 L. The reaction container was made of PTFE and equipped with a mixer and a thermometer. Then, 800 g of urea was added to the fluorosulfonic acid in the reaction container little by little with cooling to prepare a fluorosulfonic acid solution containing urea.

Alongside, 2.4 kg of fluorosulfonic acid and 100 g of bis(fluorosulfonyl)imide ammonium salt were placed in a reaction container whose internal volume was 5 L. The reaction container was made of stainless, and the surface of the reaction container was coated by PTFE. The container was equipped with a mixer, a thermometer, and a gas flowmeter. The fluorosulfonic acid and the bis(fluorosulfonyl)imide ammonium salt in this reaction container made of stainless steel were heated to hold its temperature at 120° C. To the heated fluorosulfonic acid and the bis(fluorosulfonyl)imide ammonium salt, the fluorosulfonic acid solution dissolving the urea was dripped at a rate of 525 g/Hr with a metering pump. Generation of carbon dioxide was confirmed once the dripping started. Then, carbon dioxide gas was generated at a constant rate. At the end of the dripping, 292 L of gas was generated as a total. The reaction temperature during the dripping was kept between 120 to 125° C. The reaction liquid was cooled to the room temperature, dissolved in water, and analyzed with $^{19}$F-NMR. In the analysis, the peak showing the presence of bis(fluorosulfonyl)imide at 52.1 ppm was detected. The recovery using the precursor urea as an internal standard was 43%.

Example 4

First, 3.2 kg of fluorosulfonic acid was placed in a reaction container whose internal volume was 5 L. The reaction container was made of PTFE and equipped with a mixer and a thermometer. Then, 800 g of urea was added to the fluorosulfonic acid in the reaction container little by little with cooling to prepare a fluorosulfonic acid solution containing urea.

Alongside, 2.4 kg of fluorosulfonic acid and 100 g of bis(fluorosulfonyl)imide potassium salt were placed in a reaction container whose internal volume was 5 L. The reaction container was made of stainless, and the surface of the reaction container was coated by PTFE. The container was equipped with a mixer, a thermometer, and a gas flowmeter. The fluorosulfonic acid and the bis(fluorosulfonyl)imide potassium salt in this reaction container made of stainless steel were heated to hold its temperature at 120° C. To the heated fluorosulfonic acid and the bis(fluorosulfonyl)imide potassium salt, the fluorosulfonic acid solution dissolving the urea was dripped at a rate of 525 g/Hr with a metering pump. Generation of carbon dioxide was confirmed once the dripping started. Then, carbon dioxide gas was generated at a constant rate. At the end of the dripping, 292 L of gas was generated as a total. The reaction temperature during the dripping was kept between 120 to 125° C. The reaction liquid was cooled to the room temperature, dissolved in water, and analyzed with $^{19}$F-NMR. In the analysis, the peak showing the presence of bis(fluorosulfonyl)imide at 52.1 ppm was detected. The recovery using the precursor urea as an internal standard was 43%.

Example 5

First, 3.2 kg of fluorosulfonic acid was placed in a reaction container whose internal volume was 5 L. The reaction container was made of PTFE and equipped with a mixer and a thermometer. Then, 800 g of urea was added to the fluorosulfonic acid in the reaction container little by little with cooling to prepare a fluorosulfonic acid solution containing urea.

Alongside, 2.4 kg of fluorosulfonic acid and 400 g of the end reaction liquid obtained in Example 1 were placed in a reaction container whose internal volume was 5 L. The reaction container was made of stainless, and the surface of the reaction container was coated by PTFE. The container was equipped with a mixer, a thermometer, and a gas flowmeter. The fluorosulfonic acid and the end reaction liquid obtained in Example 1 in this reaction container made of stainless steel were heated to hold its temperature at 120° C. To the heated fluorosulfonic acid and the end reaction liquid obtained in Example 1, the fluorosulfonic acid solution dissolving the urea was dripped at a rate of 660 g/Hr with a metering pump. Generation of carbon dioxide was confirmed once the dripping started. Then, carbon dioxide gas was generated at a constant rate. At the end of the dripping, 290 L of gas was generated as a total. The reaction temperature during the dripping was kept between 120 to 125° C. The reaction liquid was cooled to the room temperature, dissolved in water, and analyzed with $^{19}$F-NMR. In the analysis, the peak showing the presence of bis(fluorosulfonyl)imide at 52.1 ppm was detected. The recovery using the precursor urea as an internal standard was 43%.

Comparative Example

First, 600 g of fluorosulfonic acid was placed in a reaction container whose internal volume was 1 L. The reaction container was made of PTFE and equipped with a mixer and a thermometer. Then, 100 g of urea was added to the fluorosulfonic acid in the reaction container little by little with cooling to prepare a reaction liquid in which the urea was dissolved in the fluorosulfonic acid solution. Then, this reaction liquid was heated in an oil bath to 115° C. Generation of carbon dioxide was confirmed when the temperature of the reaction liquid reached to about 110° C. After the start of the generation of gas, carbon dioxide gas was blew out violently, and the temperature of the reaction liquid reached to 172° C. in 20 minutes. Then, the generation of heat and carbon dioxide gas went down, and the reaction ended. After that, 260 g of the mixture made of bis(fluorosulfonyl)imide and fluorosulfonic acid was recovered from the reaction liquid by distillation under reduced pressure. The residue after the recovery was ammonium salt of fluorosulfonic acid. The constituent of the recovered mixture was analyzed with $^{19}$F-NMR. In the analysis, the peak showing the presence of bis(fluorosulfonyl) imide at 52.1 ppm was detected. The recovery using the precursor urea as an internal standard was 40%.

While preferred embodiments of the invention have been described above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

INDUSTRIAL APPLICABILITY

The present invention relates to a method for producing bis(fluorosulfonyl)imide. In the method for producing bis (fluorosulfonyl)imide, an unreacted mixed liquid is prepared by mixing urea and fluorosulfonic acid in a condition free of a chemical reaction between the fluorosulfonic acid and the urea at the room temperature in advance. By dripping this unreacted mixed liquid into a separately prepared heated fluorosulfonic acid or bis(fluorosulfonyl)imide, bis(fluorosulfonic)imide can be produced while controlling the generation of carbon dioxide gas and reaction heat.

The invention claimed is:

1. A method for producing bis(fluorosulfonyl)imide comprising the steps of:
    preparing an unreacted mixed liquid by mixing a first fluorosulfonic acid with urea in a condition free of a chemical reaction between the first fluorosulfonic acid and the urea; and
    dripping the unreacted mixed liquid into a heated second fluorosulfonic acid or a heated bis(fluorosulfonyl)imide so as to cause a chemical reaction between fluorosulfonic acid and urea to proceed.

2. A method for producing bis(fluorosulfonyl)imide according to claim 1,
wherein the temperature of the heated second fluorosulfonic acid or the heated bis(fluorosulfonyl)imide in the step of dripping ranges from 100° C. to 170° C.

3. A method for producing bis(fluorosulfonyl)imide according to claim 1,
wherein at least one member selected from the group consisting of bis(fluorosulfonyl)imide and bis(fluorosulfonyl)imide salt represented by a chemical formula (A) below is added to the second fluorosulfonic acid, and
M in the chemical formula (A) is a cation selected from the group consisting of Na, K, Li, and ammonium $(FSO_2)_2N.M$      (A).

4. A method for producing bis(fluorosulfonyl)imide according to claim 1,
wherein an end reaction liquid that contains bis(fluorosulfonyl)imide is added to the second fluorosulfonic acid.

5. A method for producing bis(fluorosulfonyl)imide according to claim 3,
wherein an end reaction liquid that contains bis(fluorosulfonyl)imide is added to the second fluorosulfonic acid.

6. A method for producing bis(fluorosulfonyl)imide according to claim 2,
wherein at least one member selected from the group consisting of bis(fluorosulfonyl)imide and bis(fluorosulfonyl)imide salt represented by a chemical formula (A) below is added to the second fluorosulfonic acid, and
M in the chemical formula (A) is a cation selected from the group consisting of Na, K, Li, and ammonium $(FSO_2)_2N.M$      (A).

7. A method for producing bis(fluorosulfonyl)imide according to claim 2,
wherein an end reaction liquid that contains bis(fluorosulfonyl)imide is added to the second fluorosulfonic acid.

8. A method for producing bis(fluorosulfonyl)imide according to claim 6,
wherein an end reaction liquid that contains bis(fluorosulfonyl)imide is added to the second fluorosulfonic acid.

\* \* \* \* \*